United States Patent Office 3,458,440
Patented July 29, 1969

3,458,440
DEMINERALIZATION OF POLAR LIQUIDS
Kenneth A. Schmidt, Clarendon Hills, Ill., assignor to Nalco Chemical Company, Chicago, Ill., a corporation of Delaware
No Drawing. Filed Aug. 23, 1965, Ser. No. 481,935
The portion of the term of the patent subsequent to May 2, 1984, has been disclaimed
Int. Cl. B01d 15/04
U.S. Cl. 210—32                        1 Claim

ABSTRACT OF THE DISCLOSURE

A process for demineralizing water in which water containing inorganic salts is placed in contact with a cation exchange resin in the hydrogen form and an anion exchange resin in the sulfite form. In the process, the exhausted resins are regenerated through the use of sulfurous acid. The present system has the advantage that no calcium precipitation occurs.

---

The present invention is directed in general to the demineralization of water or other polar liquids with ion exchange resins one of which is a cation exchange resin in the hydrogen form and the other of which is an anion exchange resin in the sulfite form. More particularly, the invention is directed to an improved process for demineralizing water with an ion exchange system and to the regeneration of the ion exchange system. The two types of resins may be contacted with raw water or other polar liquid sequentially or in a mixed bed containing a resin in the hydrogen form and another resin in the sulfite form.

Under present practice water is usually demineralized with an ion exchange system consisting of a cation exchange resin in the hydrogen form and an anion exchange resin in the hydroxide form. The hydrogen ions of the cation resin are exchanged with the metal cations in the raw water, primarily sodium, magnesium and calcium, while the anions in the raw water are exchanged for the exchangeable hydroxide group of the anion exchange resin. The ultimate result of this dual resin treatment is the replacement in the water of the anions and cations by H+ and OH−.

An improved water treatment process is disclosed in my copending application Ser. No. 262,244 which was filed on Mar. 1, 1963, now Patent No. 3,317,424, the disclosure of which is incorporated herein by reference. In this process, an anion exchange resin in the sulfate form is substituted for the anion exchange resins in the hydroxide form of the prior art. The resultant ion exchange system has several distinct advantages over the prior art hydrogen-hydroxide system all of which are fully explained in the aforementioned copending application. In general, the hydrogen-cation, sulfate-anion exchange res in system disclosed in my copending application has an advantage in that only one regenerant need be used to regenerate the exhausted resins to the hydrogen and sulfate forms. This regenerant may be spent or fresh aqueous sulfuric acid, the cation of which regenerates the cation resin to the hydrogen form and the anion of which converts the anion resin to the bisulfate form. The bisulfate form can then be converted to the sulfate form by rinsing with raw water of low solids or with demineralized water. In accordance with a special feature of my prior invention, the conversion of the anion exchange resin from the bisulfate form to the sulfate form may be accelerated by the incorporation into the rinse water of a small amount of a base, such as sodium hydroxide, sodium carbonate, or, preferably, aqueous ammonia.

Another advantage of the hydrogen form and sulfate form ion exchange resin system is that the ion exchange resin in sulfate form undergoes considerably less volume change in the conversion of the resin from the sulfate form to the chloride form, bisulfate form, bicarbonate form, etc., and vice versa, in the regeneration and exhaustion cycles than does the anion exchange resin in the conversion from the hydroxide form to the chloride, bisulfate, sulfate, bicarbonate, etc. form and vice versa. The larger alternating expansion and contraction of the anion exchange resin in the latter form considerably reduces the bed life of the ion exchange resin as a result of the weakening of the resin structure during the alternating expansion and contraction. Furthermore, in anion exchange apparatus, such as the Higgins reactor in which the anion exchange resin is relatively tightly packed in confined zones of the apparatus, i.e., the individual ion exchange, regenerant, and rinsing zones, the larger volume change of the hydroxide-type anion exchange resin creates greater pressures upon the resin beads when the resin expands, thereby further accelerating the degradation of the resin structure.

In another copending application of mine, Ser. No. 421,418 filed Dec. 28, 1964, now Patent No. 3,359,199, a multi-bed system (usually a three-bed system) is disclosed which includes a weak acid cation exchange resin, a strong acid cation exchange resin, and an anion exchange resin in the polyvalent salt form and preferably the sulfate form. This multi-bed system provides a still more advantageous means for removing ions from brackish waters and the like.

As was pointed out above, it is known from the above identified copending applications that hydrogen-cation, sulfate-anion exchange resins can be regenerated by the use of sulfuric acid. One problem which is sometimes encountered in demineralizing water having a high calcium content involves the precipitation of calcium sulfate during the regeneration of the cation exchanger. In order to avoid such precipitation the regeneration of the cation exchanger is sometimes carried out in steps, beginning with a dilute sulfuric acid solution and gradually increasing the concentration of the solution.

One of the objects of the present invention is to provide an improved process for demineralizing polar liquids.

A more specific object of the invention is to provide an improved method of regenerating spent cation and anion exchange resins that are used in the demineralization of polar liquids such as water.

Another object of the invention is to provide a process for regenerating a cation exchanger to the H+ form whereby no calcium sulfate is precipitated even though the liquid being demineralized has a high calcium content.

Other objects will become apparent from the following detailed description of the invention.

In general, the present invention comprises the discovery that a much improved system for demineralizing polar liquids results where liquid is passed through a cation exchange resin in the H+ form and an anion exchange resin in the sulfite form, and wherein the exhausted resins are regenerated through the use of sulfurous acid. Inasmuch as calcium sulfite is soluble in sulfurous acid, no calcium precipitation is encountered. This is in marked contrast to the precipitation which generally occurs where sulfuric acid is used to regenerate a spent hydrogen-cation exchange resin. The present system can, of course, be used in connection with a multi-bed system (two or more beds).

The ion exchange systems of the invention, like other ion exchange systems known in the art, are equilibrium systems both in the ion exchange or resin exhaustion phase of the process and in the regeneration phase of the process. In my process, ion exchange resins are brought into contact with water or other polar liquid to be demineralized or deionized. The resin particles or beads may be slurried with the water or other polar liquid to be treated, although the more common procedure is to employ the resins in the form of beds through which the water or other polar liquid is passed and thereby brought into contact with the ion exchange resins.

The most predominant cations in raw waters, i.e., river water, lake water, well water, and the like, are sodium, calcium, and magnesium. In some instances, potassium and iron ions are also present in substantial amounts. The most commonly encountered anions in raw water are chloride, sulfate, bicarbonate and nitrate. These anions and cations, as well as any other anions or cations present in raw waters, can be effectively removed by the ion exchange system of the present invention.

Briefly, the anion exchange resins used in the practice of the invention are strongly basic anion exchange resins, i.e., anion exchange resins which in the hydroxide form are capable of converting inorganic salts in aqueous solution directly to hydroxides or weakly basic anion exchange resins. Thus, a strongly basic anion exchange resin is capable of converting an aqueous solution of sodium chloride directly to an aqueous solution of sodium hydroxide. A strongly basic anion exchange resin can also be defined as one which on titration with hydrochloric acid in water free from electrolytes has a pH above 7.0 when the amount of hydrochloric acid added is one-half of that required to reach the inflection point (equivalence point). A weakly basic anion exchange resin under the same conditions has a pH below 7.0 when one-half of the acid required to reach the equivalence point has been added. The strongly basic anion exchange resins which are available commercially are characterized by the fact that the exchangeable anion is a part of a quaternary ammonium group. The quaternary ammonium group has the general structure:

wherein $R_1$, $R_2$ and $R_3$ represent alkyl or substituted alkyl groups, and $X^-$ is a monovalent anion.

Examples of the strongly basic anion exchange resins which may be employed in the practice of the invention are those resins disclosed in U.S. Patents 2,591,573, 2,597,440, 2,597,494, 2,614,099, 2,630,427, 2,632,000 and 2,632,001.

Strongly basic insoluble anion exchange resins include reaction products of a tertiary alkyl amine and a vinyl aromatic resin having halo methyl groups attached to aromatic nuclei in the resin which resins are subsequently converted to the sulfite form. Another class of strongly basic anion exchange resins suitable for the practice of the invention are the reaction products of tertiary carbocyclic or heterocyclic amines and vinyl aromatic resins having halo methyl groups attached to aromatic nuclei in the resin which resins are subsequently converted to the sulfite form.

The vinyl aromatic resins employed as starting materials in making the anion exchange resins employed in the preferred practice of the invention are the normally solid benzene-insoluble copolymers of a monovinyl aromatic compound and a polyvinyl aromatic compound containing from 0.5 to 40% by weight, preferably from 0.5 to 20% by weight of the polyvinyl aromatic compound, chemically combined with 99.5% to 60% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene. These resins are halo methylated as described, for instance, in U.S. Patent 2,614,099, preferably to introduce an average of 0.2 to 1.5 halo methyl groups per aromataic nucleus in the copolymer and then reacted with a tertiary amine to introduce a quaternary ammonium anion exchange group. Examples of suitable tertiary amines are trimethyl amine, triethyl amine, tributyl amine, dimethyl propanol amine, dimethyl ethanol amine, methyl diethanolamine, 1-methyl-amino-2,3-propane diol, dioctyl ethanolamine, and homologues thereof.

The anion exchange resins can also be prepared by halogenating the molecule of the resin and then introducing an anion exchange group as described in U.S. Patent 2,632,000 and subsequently converting them to the sulfite form, with or without admixture with the hydroxide form of the resin.

Specific anion exchange resins that can be used as starting materials in practicing the invention include Dowex SAR and Dowex SBR. Dowex SBR is a styrene-divinylbenzene resin containing quaternary amine ion exchange groups in which the three R groups are methyl groups. This resin consists of spherical particles of 20 to 50 mesh and containing about 40% water. The divinylbenzene content is approximately 7.5%. The total exchange capacity is approximately 1.2 equivalents per liter, wet volume. Dowex SAR is similar to Dowex SBR except that one of the methyl groups in the quaternary amine salt structure is replaced by a hydroxy ethyl group. Dowex SBR is somewhat more basic than Dowex SAR.

From a regeneration or conversion standpoint, the $HSO_3^- \rightleftharpoons SO_3^{--}$ reaction is independent of the anion resin used. For this reason both strong base anion exchange resins and weak base anion exchange resins are contemplated within the scope of this invention. The commercially available products Dowex WGR and Dowex WBR are examples of polyamine-type weak base resins. Such resins usually contain a mixture of primary, secondary, and tertiary amine groups.

The strong acid cation exchange resin provides exchangeable hydrogen ions. Resins of this nature are known in the prior art, one of the most common types thereof being a sulfonated resin. Dowex HCR-W is a sulfonated styrene divinyl benzene strongly acid cation exchanger of the type described in U.S. Patent 2,366,007.

Another suitable type of hydrogen form cation exchange resin is a sulfonic acid phenol-formaldehyde resin such as a resin derived by condensing a phenol sulfonic acid with formaldehyde. In general, resins having a plurality of sulfonic acid groups are the most suitable strong acid cation exchange resins for purposes of this invention.

Weak acid resins that can be used in the present process where a multi-bed system (two or more beds) is employed comprise the present commercially available weakly acidic type resins containing carboxylic groups as the functional sites. These acids are analogous to weakly basic resins in most respects. The weak acid resins are operable at a pH above 5.5 and do not split salts of strong acids. One available product is identified by the trademark Dowex CCR. According to an article by A. Hinsley, Proc 23d An. Water Conf. Engr. Soc. of Western Pennsylvania, October 1962, Dowex CCR is a condensation product containing both phenolic and carboxylic groups. This resin can remove sodium carbonate from water. If polyvalent cations are present, however, the resin is more selective for polyvalent ions such as calcium and magnesium than monovalent ions such as sodium or potassium. Dowex CCR was used in the tests set out in the subject specification. It should be kept in mind, however, that other weak acid ion exchange resins can be used in the subject process.

WATER DEMINERALIZATION

Briefly, the equilibrium ion exchange systems of the invention are exemplified by the following equations for demineralization of water or other polar liquid containing, by way of example, sodium, calcium and magnesium cations and chloride, sulfate, bicarbonate and nitrate anions. R represents the resins. The longer arrow indicates the predominant reaction in the equilibrium systems.

*Demineralization equations:*
*Cations:*

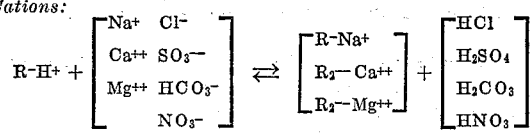

The carbonic acid may decompose in total or in part into water and carbon dioxide gas after it is formed.

*Anion:*

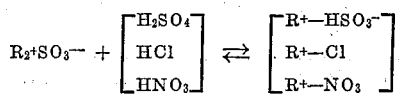

The reaction at an exchange site of the sulfite form anion exchange resin is fostered by the acidity of the aqueous media to convert the sulfite to monovalent bisulfite which requires only one exchange site to satisfy electrical bond and to sorb an anion in the aqueous phase on the other site. This may be illustrated, as follows, where $H^+X^-$ is the acid in the aqueous phase and $X^-$ is its anion.

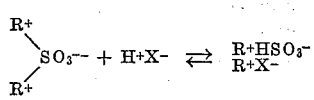

In demineralization of water, $X^-$ is predominantly one or more of $Cl^-$, $HSO_3^-$, $NO_3^-$, $SO_3^{--}$ and $SO_4^{--}$.

When the three strong acids, hydrochloric acid, sulfuric acid, and nitric acid, produced as the effluent from the cation exchange resin, are passed downwardly for example, through a bed of such anion exchange resin, the top portion of the bed will be predominantly in the nitrate form, the mid-portion will be predominantly in the chloride form, and the lower portion of the bed will be predominantly in the bisulfite form.

The regeneration of the two resins with aqueous sulfurous acid, followed by a water rinse or an aqueous alkaline rinse may be exemplified by the following regeneration equations.

*Regeneration equations:*

*Cation:*

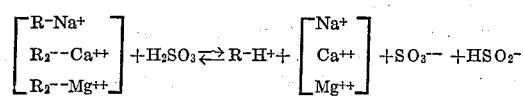

Anion:

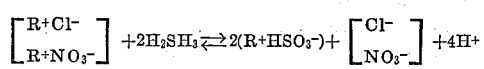

The following equation represents regeneration of the anion resin with aqueous sulfite salt solution.

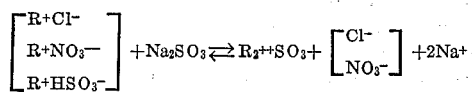

In a mixed bed, the volume ratio of cation exchange resin in the hydrogen form and anion exchange resin in the sulfite form may be in the range of about 6:1 to 1:6. The optimum ratio for any given water will depend upon the chemical content of the water, i.e., its alkalinity, bicarbonate content, etc. The exact proportions can be worked out without difficulty for each specific water in order to obtain exhaustion of both resin forms at about the same time.

It has been discovered that raw water or other polar liquid or semipolar liquid having relatively low ionized solids content to high ionized solids content can be demineralized or deionized at economical costs and with simple ion exchange and regeneration procedures. The hydrogen form cation exchange resin and the sulfite form anion exchange resin function with sufficient efficiency so as to remove 90% or more of the total ionized salts of raw waters (neutral, acidic, or alkaline). The process is a practical one for the demineralization of raw waters for municipal water treatment plants in providing water to be used for human consumption or for demineralization (or selective acid sorption) of acidic waste waters (or acid mine water wastes).

One of the chief advantages of the ion exchange system of the invention in the treatment of raw waters for municipal use is the low cost of the regenerant, i.e., sulfurous acid. Sulfurous acid is one of the most inexpensive chemicals available.

A further aspect of the invention relates to the use of ion exchange systems of the invention for the production of a substantially completely demineralized or deionized water. Because the operation of an ion exchange system of the invention is more economical than a system employing an anion exchange resin in the hydroxide form, substantially totally demineralized or deionized water can be produced utilizing the ion exchange system of the invention for the first or primary ion removal, followed by an ion exchange treatment with an anion exchange resin in the hydroxide form to remove the salts (e.g., NaCl) which leak past the primary cation resin treatment. The latter provides a polishing function in the removal of residual anions not removed by the anion exchange resin in the sulfite form in the primary or first treatment. If salts, as contrasted with the free acids, are present in the first or primary treatment effluent the polishing is done with both a cation exchange resin in the hydrogen form and an anion exchange resin in the hydroxide form. The primary treatment-polishing treatment above described is economically advantageous in that the more expensively regenerated anion exchange resin in the hydroxide form has a considerably smaller ion removal load and thus does not need to be regenerated as often.

$H_2SO_3$ REGENERATION

The aqueous sulfurous acid regeneration of the cation exchange resin to the hydrogen form is accomplished efficiently with saturated solutions of sulfurous acid. At normal temperatures a saturated solution will contain about 8 to 9% sulfurous acid. In general, a solution containing from ½% sulfurous acid to a saturated solution is satisfactory for most purposes. Under increased pressure, of course, higher percentages of sulfurous acid can be maintained in solution.

The regenerant level, when defined on the total volume of mixed bed (and not on the cation fraction thereof) will vary (a) in proportion of cation to anion, and (b) in accordance with cation regeneration level needed. The following example illustrates the possible variations:

| Mixture | Acid required, lbs. | |
|---|---|---|
| | Per cu. ft. cation | Per cu. ft. mixed bed |
| 1C-1A | 5 | 2.5 |
| 1C-1A | 10 | 5.0 |
| 3C-1A | 10 | 7.5 |
| 1C-3A | 10 | 2.5 |

As an extreme regenerant level one could select a ratio of one cation to four anion and an acid dosage of three pounds of acid per cubic foot of cation, equivalent to a minimum of about 0.6 pound of acid per cubic foot of mixed bed. At the other extreme, one could select a ratio of four cation to one anion and a dosage of 15 pounds of sulfurous acid per cubic foot of cation, or 12 pounds of acid per cubic foot of mixed bed.

The preferred amount of acid should be based on a mixtue containing equivalent capacity ratios of about 1 volume cation (21 kilograins per cubic foot capacity) to 1.5 volumes of anion (14 kilograins per cubic foot in the sulfate cycle) and an acid level of 4 pounds to 8 pounds per cubic foot of cation resin, equivalent to a mixed bed regeneration level of 1.6–3.2 pounds per cubic foot.

In a mixed bed consisting of strongly basic anion exchange resin and a strongly acid cation exchange resin regeneration with sulfurous acid is very efficient. The mixed resin bed comprises relatively uniformly dispersed beads or particles of the two resins in physical admixture. As in the conventional methods of regeneration, the $H_2SO_3$ will displace the sorbed cations contained on the exhausted cation resin, providing on their ion exchange sites the cation $H^+$. In like manner, however, and occurring simultaneously in a mixed bed, the anions sorbed by the anion resin will be displaced by $HSO_3^-$ from the regenerant solution. After complete regeneration, the cation resin will be in the $H^+$ form; the anion resin will be in the $HSO_3^-$ form. Upon rinsing the anion resion with water or aqueous akali, the $HSO_3^-$ will dissociate to $SO_3^{--}$ (which will be held by the anion resin). The eluted $H^+$ and eluted $HSO_3^-$ will form $H_2SO_3$ or a sulfite salt in the case of alkali rinse. The $H_2SO_3$ generated by the anion resin upon water rinse offers no detrimental effect to the system and will be flushed free of the bed or will be neutralized by the alkali.

RINSING TO CONVERT BISULFITE TO SULFITE

In the field of water treatment, as opposed to the field of chemical processing, demineralized water is not economically practical as the rinsing liquid for converting the anion exchange resin in the bisulfite form to the sulfite form. As a practical matter, the only water available as the rinse water in the area of water treatment is the raw water itself. This does not pose too great a problem with low total dissolved solids raw water when the ion exchange system is one employing the anion exchange resin and the cation exchange resin in separate beds, because the former can be rinsed independently with low total dissolved solids raw water for the conversion of the bisulfite to the sulfite.

In rinsing a mixed bed with raw water to accomplish the anion regeneration from bisulfite to sulfite, the cation exchange resin would be experiencing, during regeneration, exhaustion due to the metal cations of dissolved salts contained in the raw water. To eliminate this problem, a separate rinse of both resins may be employed.

The separate rinse procedure follows the acid regeneration of the mixed anion and cation exchange resins. The mixed resin bed is then backwashed at a sufficient velocity to agitate the bed. Under sufficient agitation the more dense cation exchange resin particles or beads will separate and settle in the bottom zone of the bed, while the less dense anion exchange particles or beads will be located in the upper portion of the bed. The alkali rinse can then be flowed downwardly through the anion exchange resin in the upper portion of the bed and tapped off at the approximate dividing line between the upper and lower resin layers so that it does not flow in any substantial degree into the lower portion of the bed containing cation resin. Simultaneously, a small amount of rinse water can be flowed upwardly through the lower portion of the bed to rinse out sulfurous acid regenerant in the lower portion of the bed. For further details as to the general technique, see U.S. Patent No. 2,771,424.

After a sufficient amount of rinse water is flowed through the upper portion of the bed containing the anion exchange resin to convert the latter from the bisulfite to the sulfite form, the bed can then be blown from the bottom portion thereof with air having a velocity sufficient to remix the bed, in which condition it is again ready for the demineralization phase of the process.

ALKALI RINSE

The conversion of the anion exchange resin bisulfite to the sulfite form can be accelerated by using an alkaline rinse water. Alkaline compounds used as the make-up for alkaline rinse water are, in the order of preference, lime, ammonium hydroxide (aqueous ammonia), sodium bicarbonate, and sodium hydroxide. Potassium biscarbonate or potassium hydroxide may also be used, although the latter are usually more expensive than the coresponding sodium or calcium compounds.

The total amount of alkali in the rinse water is related stoichiometrically to the amount of hydrogen ion eluted into the rinse water by the conversion

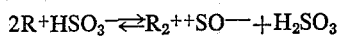

The total quantity of alkali is best kept close to the stoichiometric amount required to neutralize the eluted hydrogen ion. Furthermore, the anion exchange resin is best rinsed as a slurry in both sodium hydroxide solution and in sodium dicarbonate solution because the anions of these solutions have sufficient dissociation so that they tend to displace the newly regenerated sulfite groups on the resin if it is rinsed by flowing the alkali rinse water through the bed. For example, if aqueous sodium hydroxide solution were flowed downwardly through a cation resin bed in the bisulfite form, the newly regenerated sulfite groups in the upper portion of the bed would be converted in a substantial proportion to hydroxide groups by the sodium hydroxide. Aqueous ammonia, on the other hand, has little tendency to displace the sulfite groups and can be used in a bed rinse.

Accordingly, among the aqueous alkali rinse solutions, aqueous ammonia is the most efficient because its hydroxide ions have the least tendency to be consumed in the side reaction of displacement of sulfite groups on the resin with hydroxide groups. Therefore, the total amount of ammonia used in the rinse may be about the stoichiometric equivalent of the eluted hydrogen ion, or a slight excess, e.g., up to about 110% of the stoichiometric equivalent. With aqueous sodium hydroxide or aqueous sodium bicarbonate rinse solutions, on the other hand, the excess needed for complete neutralization of eluted hydrogen ion may be greater due to consumption of part of the base by the aforesaid side reaction. For this reason, the total amount of sodium hydroxide or sodium bicarbonate required to effect complete neutralization of the eluted hydrogen ion may be as high as about 125% of the stoichoimetric equivalent.

It is contemplated that in some cases it may be to advantage to use a starvation amount of alkali, i.e., less than the stoichiometric equivalent, in order to minimize the aforesaid side reaction. In such case, starvation amounts of any of the aforementioned alkali compounds as low as 50% of the stoichiometric equivalent may be used. Therefore, with an aqueous alkali rinse wherein sodium hydroxide or sodium bicarbonate is the alkali compound, the total amount of alkali component in the rinse water may be 50–125% of the stoichiometric equivalent to the amount of eluted hydrogen ion. With an aqueous ammonia rinse, the percentage range is 50–110% of the stoichiometric equivalent. The concentration of the aforesaid alkali compounds in the rinse water is not of crucial importance and may range from a few parts per million, e.g., 5 p.p.m., up to about 5%.

RAW WATER REGENERATION OF ANION EXCHANGE RESIN

Another technique for regenerating the exhausted anion exchange resin is to utilize raw water which has a sulfite anion content of at least one p.p.m. or to use raw water supplemented by the addition of a sulfite salt, e.g., sodium sulfite, as the regenerant solution. Inasmuch as the anion exchange resin has a preference for sulfite anion over chloride, nitrite or bisulfite anion, the sulfite anion of the raw rinse water will push off from the resin the other anions. This regenerant equilibrium system is illustrated in the following equation in which the sulfite salt in the raw water is sodium sulfite.

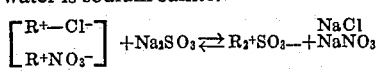

The concentration of the sulfite anion in the raw water rinse, either the natural concentration or the concentration resulting from the supplement of the raw water with the sulfite salt, should be in the range of 10 to 100,000 p.p.m., preferably 50–5000 p.p.m.

It will be appreciated that the raw water regeneration technique will have an adverse effect upon the cation exchange resin in the hydrogen form inasmuch as the cations in the raw water regenerant will displace hydrogen ions on the cation resin. Accordingly, the raw water regeneration technique should be used when the anion resin and the cation resin are maintained in separate beds and can be regenerated separately or, in the case of mixed beds, when the resins are separated into layers by backwashing for the regeneration step by the procedure described above. In the latter case, the raw water regenerant can be flowed downwardly through the upper, anion exchange resin layer of the backwashed bed while the acid regenerant is flowed upwardly through the lower, cation exchange resin layer. Both the raw water regenerant and the acid regenerant are discharged from the vessel containing the resins at the approximate dividing line between the upper and lower resin layers.

While the foregoing description has been related largely to demineralization of water to remove salts with chloride, nitrate, bicarbonate, carbonate, sulfite, bisulfite and/or like anions, the same techniques can be applied to demineralization or deionization or other polar liquids or semipolar liquids containing salts with these anions. Organic polar liquids and organic semipolar liquids containing such inorganic salts, e.g., ash-laden liquids, behave in the ion exchange systems herein described like the water containing such salts. The demineralization processes herein described are therefore operable in demineralization of water, mixtures of water and water-miscible organic liquids, polar organic liquids or semipolar organic liquids. Water-soluble, polar and semipolar solvents include: lower aliphatic alcohols such as ethyl, methyl, isopropyl; ketones such as acetone and dimethylketone; polyols such as glycerol and ethylene glycol; ethers such as diethyl ether, di-isopropyl ether, etc.

The demineralization of water by the processes of the invention are effective in removing the commonly occurring ions of waters of low total dissolved solids to high total dissolved solids, e.g., brackish waters containing 800–4000 p.p.m. total dissolved solids, to the degree that the latter waters are made potable or can be used for industrial purposes wherein the residual dissolved solids content is tolerable. An anion exchange resin (OH⁻ form) and cation exchange resin (H⁺ form) can be used as a follow-up or polishing treatment to remove residual ions, if desired. The efficiency of the anion exchange resin, i.e., percent of total inorganic salts removed, in the sulfite form increases as the inorganic salt content of the water increases without a parallel increase in the amount of resin required. The process is useful in demineralization of low inorganic salt-content water or high inorganic salt-content water, e.g., brackish waters. The invention is useful in demineralization of waters having a wide range in dissolved inorganic salt content, i.e., for low total dissolved solids water having upwardly from 10 or 15 p.p.m. total inorganic salts such as salts with sodium, potassium, magnesium, calcium and/or iron cations and chloride, bromide, iodide, bicarbonate, carbonate, sulfite and/or bisulfide anions and including brines and brackish waters in which the total content of said inorganic salts may be as high as 50,000 p.p.m. or even 100,000 p.p.m.

It will be appreciated from the foregoing description of the invention that the conversion of the anion exchange resin from the bisulfite form to the sulfite form can be accomplished by any one of several procedures. For example, in a mixed bed in which the anion and cation resins remain mixed, the mixed bed may be regenerated with sulfurous acid and may be then rinsed with deionized water or with low dissolved solids raw water which will not appreciably exhaust the cation exchange resin in the hydrogen form until the conversion is accomplished. When the anion and cation resins are employed in separate beds or are separated in a mixed bed into upper and lower layers during regeneration, the regenerant may be dilute sulfurous acid passed through both layers, or the regenerants may be raw water with appreciable sulfite content (natural or supplemented) for the anion exchange resin and an aqueous solution of any strong acid, e.g., sulfuric acid, hydrochloric acid, etc., for the cation exchange resin. The cation exchange resin need be rinsed only with sufficient water to remove residual acid regenerant from the bed although more than this amount can be used without adverse effect if the water is deionized water or low dissolved solids raw water. The anion exchange may be rinsed of regenerant solution with the same water as is used to rinse the cation exchange resin, or it may be rinsed independently of the cation resin rinse. It will be appreciated that the conversion of the anion resin from bisulfite to sulfite with water alone requires considerably more water than is required to rinse out acid regenerant from the regenerated cation resin. Therefore, especially when the rinse water contains appreciable dissolved solids which would exhaust to an appreciable degree the regenerated cation resin, or when an alkali rinse is used in the bisulfite to sulfite conversion, separate rinses of the regenerated cation and anion exchange resins should be employed. The water rinsing of the cation exchange resin need only be an amount sufficient to wash out the residual acid regenerant. The rinsing of the anion exchange resin regenerated directly to the sulfite form by regeneration with aqueous sulfite salt solution need not be rinsed or may be rinsed to wash out sulfite salt solution if desired with its own rinse water or the water used to rinse the cation resin. The rinsing of the anion exchange resin regenerated by sulfurous acid, on the other hand, requires a larger amount of water, with or without the alkali rinse step, sufficient to convert the bisulfite form to sulfite form. With a mixed bed separated into anion resin or cation resin layers by backwashing, or in separately maintained cation and anion resin beds, both resins may be rinsed after sulfurous acid regeneration with the same rinse water in an amount sufficient to wash out the regenerant sulfurous acid, after which only the anion exchange resin is further rinsed with water alone or with the aqueous alkali supplement to convert the anion resin to the sulfite form.

Another aspect for rinsing techniques which can reduce cost of regeneration of the anion resin is to regenerate the resin bed by an upflow rinse with water alone or preferably with an alkali supplement. Taking, for example, the situation where the sorbed anions on the exhausted anion exchange resin are chloride and bisulfite, chloride being most preferred by the resin, will be located mostly in the upper portion of the bed and bisulfite in the lower portion of the bed. As rinse water flows upwardly through the bottom portion of the bed, bisulfite is converted to sulfite with the generation of sulfurous acid. Very dilute sulfurous acid in turn, tends to be sorbed by the resin as sulfite. The resin has greater selectivity or preference for sulfite than for chloride, and the latter ions are displaced to some extent by sulfite. This technique will not regenerate completely the anion resin, but it may be used alone periodically or ahead of regeneration with sulfite salt solution regeneration to economize on regenerant chemical cost. The upflow rinse with aqueous alkali solution wherein the total alkali content is 50–125% of the stoichiometric equivalent of the hydrogen ions of the sulfurous acid generated by the bisulfite to sulfite conversion may be used to advantage in the upflow rinse technique to accelerate the rate of regeneration. The alkali and generated sulfurous acid react to provide a sulfite salt.

The invention may be used in many situations, one of which is the demineralization of high dissolved solids water to make it potable. For example, one can treat economically a saline or hard natural water to reduce the inorganic salt content or alkali content to a potable level. The process can also be used by industrial plants, with or without the follow-up polishing treatment, to reduce inorganic salt content of its supply water to the level most suitable for the particular industrial use of the water. Also, many times it is desirable or required by law that waste water discharged by a plant into a stream or other body of water be below a certain salt or free acid level in order that the stream or other body of water is not adversely contaminated. In such cases, the invention can be employed to demineralize the waste water to a lower salt level before it is discharged into the stream or other water body.

As was pointed out above, the present process is an improvement on the process disclosed in my copending application Ser. No. 262,244, now Patent No. 3,317,424. The disclosure set out in said copending application as well as the disclosure of copending application Ser. No. 421,418, now Patent No. 3,359,199, are incorporated herein by reference. The mode of operation apart from the use of a bisulfite-sulfite system in place of a bisulfate-sulfate system and the use of sulfurous acid rather than sulfuric acid as a regenerant is substantially the same in the present application as in application Ser. No. 262,244, now Patent No. 3,317,424.

I claim:
1. A process for the demineralization of water which comprises bringing water containing dissolved inorganic salts into contact with a cation exchange resin in the hydrogen form, and thereby exchanging the hydrogen ions of said cation exchange resin for the cations of said salts and forming the acids of the anions of said salts; and bringing the water containing said acids into contact with an anion exchange resin in the sulfite form, and thereby sorbing said acids on said anion exchange resin by a chemical reaction including conversion of exchangeable sulfite groups on said resin to bisulfite groups, regenerating the exhausted cation exchange resin with acid, and regenerating the exhausted anion exchange resin with raw water having sufficient sulfite content to regenerate said anion exchange resin to the sulfite form.

References Cited

UNITED STATES PATENTS

| | | | |
|---|---|---|---|
| 2,692,244 | 10/1954 | Kunin et al. | 210—37 X |
| 2,772,237 | 11/1956 | Bauman et al. | 210—32 X |
| 2,868,832 | 1/1959 | Taylor et al. | 210—37 X |
| 3,156,531 | 11/1964 | Luten et al. | 210—37 X |
| 3,252,897 | 5/1966 | Hesler et al. | 210—38 X |
| 3,317,424 | 5/1967 | Schmidt | 210—37 X |

OTHER REFERENCES

Anderson et al.: Industrial & Engineering Chemistry, vol. 47, issue 8, pp. 1620–1623, August 1955.

F. Helfferich: Ion Exchange, 1962, McGraw-Hill, New York, pp. 148–151.

REUBEN FRIEDMAN, Primary Examiner

C. M. DITLOW, Assistant Examiner

U.S. Cl. X.R.

210—37, 38

UNITED STATES PATENT OFFICE
CERTIFICATE OF CORRECTION

Patent No. 3,458,440                                   July 29, 1969

Kenneth A. Schmidt

It is certified that error appears in the above identified patent and that said Letters Patent are hereby corrected as shown below:

Column 5, line 5, "$SO_3\text{--}$" should read -- $SO_4\text{-- --}$; line 52, "$2H_2SH_3$" should read -- $2H_2SO_3$ --. Column 8, line 8, "SO" should read -- $SO_3$ --; line 13, "dicarbonate" should read -- bicarbonate --. Column 9, line 63, "fide" should read -- fite --.

Signed and sealed this 28th day of April 1970.

(SEAL)
Attest:

Edward M. Fletcher, Jr.                        WILLIAM E. SCHUYLER, JR.
Attesting Officer                                     Commissioner of Patents